United States Patent
Jiang et al.

(10) Patent No.: US 9,002,320 B2
(45) Date of Patent: Apr. 7, 2015

(54) ADVANCED PREDICTIVE INTELLIGENCE FOR TERMINATION BYPASS DETECTION AND PREVENTION

(75) Inventors: John Yue Jun Jiang, Danville, CA (US); David Gillot, Brussels (BE)

(73) Assignee: Roamware, Inc., San Jose, CA (US)

( * ) Notice: Subject to any disclaimer, the term of this patent is extended or adjusted under 35 U.S.C. 154(b) by 792 days.

(21) Appl. No.: 13/176,508

(22) Filed: Jul. 5, 2011

(65) Prior Publication Data

US 2012/0021720 A1     Jan. 26, 2012

Related U.S. Application Data (60) Provisional application No. 61/361,136, filed on Jul. 2, 2010.

(51) Int. Cl.
| | |
|---|---|
| *H04W 12/12* | (2009.01) |
| *H04W 24/06* | (2009.01) |
| *H04M 15/00* | (2006.01) |
| *H04M 15/08* | (2006.01) |
| *H04W 4/24* | (2009.01) |
| *H04W 8/06* | (2009.01) |
| *H04W 8/12* | (2009.01) |
| *H04W 88/16* | (2009.01) |

(52) U.S. Cl.
CPC ............. *H04W 24/06* (2013.01); *H04M 15/00* (2013.01); *H04M 15/08* (2013.01); *H04M 15/8038* (2013.01); *H04M 15/8044* (2013.01); *H04W 4/24* (2013.01); *H04W 8/06* (2013.01); *H04W 8/12* (2013.01); *H04W 88/16* (2013.01)

(58) Field of Classification Search
CPC . H04M 15/00; H04M 15/08; H04M 15/8038; H04M 15/8044; H04W 24/06; H04W 4/24; H04W 88/16; H04W 8/06; H04W 8/12
USPC ......... 455/410, 433, 411, 445, 422, 426, 432, 455/435, 458, 461, 550, 459; 379/114.14, 379/189, 188, 127.02, 196
See application file for complete search history.

(56) References Cited

U.S. PATENT DOCUMENTS

| | | | |
|---|---|---|---|
| 2009/0061860 A1* | 3/2009 | Jiang | ............................ 455/433 |
| 2009/0137245 A1 | 5/2009 | Richardson et al. | |

OTHER PUBLICATIONS

Spanish Office Action dated Apr. 24, 2014 issued in Spanish Patent Application No. 201290089.

* cited by examiner

*Primary Examiner* — Babar Sarwar
(74) *Attorney, Agent, or Firm* — Arent Fox LLP (57) ABSTRACT

Provided are methods and systems for detecting and preventing bypass fraud in telecommunication networks, primarily for detecting and preventing SIM box fraud in telecommunication networks. The methods include generating one or more test calls from a remote agent to a local agent where the remote agent can be a roaming agent or a remote dialer. The local agent is a subscriber number. The methods further include facilitating call forwarding of the test calls from the local agent to a local number. The methods include identifying the presence of bypass fraud by analyzing caller identification information of the test call received on the local number. Finally, the methods include preventing future use of a detected SIM box.

41 Claims, 7 Drawing Sheets

FIG. 7 ially related to fraud dete...

ADVANCED PREDICTIVE INTELLIGENCE FOR TERMINATION BYPASS DETECTION AND PREVENTION

RELATED APPLICATIONS

This application claims the benefit of U.S. provisional patent application No. 61/361,136 titled "Advanced Predictive Intelligence," filed on Jul. 2, 2010, the entirety of which is incorporated by reference herein.

FIELD OF THE INVENTION

Aspects of the present invention generally relate to fraud detection and prevention in telecommunication networks. More specifically, aspects of the present invention relate to methods and systems for real time detection and prevention of termination bypass fraud including detection and prevention of SIM box fraud in telecommunication networks.

BACKGROUND

As telecommunication technology has progressed, though on one hand it has proved immensely beneficial for all, on other hand it has given rise to various types of fraud being perpetrated in these telecommunication networks. One such fraud is called termination bypass fraud where fraudsters change the termination leg of a call (mobile call or landline call) to avoid paying termination charges to a terminating operator for this terminated call. These calls can be international or national calls that are terminated at the terminating operator.

Typically, termination bypass works by replacing the terminating call in the transit path of the call, by an originating call through using another line, thus exploiting the cost arbitrage between a termination fee of terminating operator and an originating fee of the bypass line levied by the line operator. Typically, this bypass is done using a local line although international line is also possible if the bypass fraudster commits fraud on the international line. Generally, bypass fraudsters use a GSM SIM box to generate a local GSM originating call, although such local call be also be generated by a fixed line phone, or a CDMA phone. Moreover, these by-passers can operate either On-net or Off-net. In case of on-net bypass, the bypass line used is the same as the terminating operator of the call, while in case of off-net bypass, the bypass line used is not the same.

One or more techniques have been devised for dealing with such bypass fraud. One such method is referred as Fraud Management System (FMS) where it detects SIM box for GSM mobile operators based on Call Detail Records (CDR) analysis. This primarily operates by looking at patterns of usage on SIMs. For example, when too many mobile originated calls are being made with no mobile terminated calls, then presence of SIM box can be detected. However, this pattern analysis is not done in real time. Also, the bypass fraudsters can fake usages to fool the FMS. Hence, the FMS method can either have a lot of false positives if it is too loose in its implementation logic or can have too few bypass detections if too strict in its implementation logic. In addition, the FMS method cannot detect off-net bypass fraudsters. Furthermore, FMS does not perform immediate fraudster prevention. Moreover, FMS cannot prevent the bypass fraudsters from moving off-net, which makes it effectively useless in eliminate termination bypass fraud, as off-net fraud, though less lucrative, can still keep the fraud business running.

Another technique to deal with bypass fraudsters is call generation based bypass detection. This is also called as classical call generation based bypass detection method. This method requires deploying detection modules in both terminating country and originating country and then track the international call being made from the originating country to the terminating country to detect bypasses. However, it has an implementation limitation of deploying boxes around the world in multiple networks. Like FMS, it does not perform immediate fraudster prevention. Moreover, it cannot prevent the bypass fraudsters from moving off-net, which makes it effectively useless in eliminate termination bypass fraud, as off-net fraud, though less lucrative, can still keep the fraud business running.

In yet another solution, in one of the previous patents from inventors of a referenced application, a solution has been provided for developing a "A single operator and network side solution for inbound and outbound roaming tests and discoveries of roaming partner services and fraud without involving remote probes or real roamer traffic". This solution is hereinafter, referred to as "Predictive Intelligence" or "PI".

The limitation of call generation based bypass detection methods today is that because they involve only test calls with test numbers, smart bypass fraudsters can examine the patterns of these test numbers and decide to blacklist them for future bypasses. Some of the patterns on these test numbers are either they are called too many times or they are not answered many times etc. As a result, the call generation methods lose their effectiveness in bypass detection. Even though more test numbers can be introduced, the same issue of getting detected by the bypass fraudster will rise again. Besides the fact that the test numbers are limited and each time they are used, it involves more work from the operators of these numbers, thereby creating a non-scalable solution.

While the bypass fraud detection capabilities introduced in earlier PI patent for enhancing the state of the art are clearly demonstrated in that patent, there is still further a need to apply bypass detection in a stealth manner to make it difficult for fraudsters to detect that they are being tested. In particular, test numbers used by PI for calls can be easily detected by bypassers unless it keeps changing all the time, which makes it less robust. Also the previous PI only covers call origination from mobile networks via roaming partners of a home operator network. Although these originations often share transit and termination routes with non mobile originated calls, but there are still many routes not shared. Hence it can still fail to detect termination bypass lines on those non-shared routes. Furthermore, the previous PI method does not immediately terminate a bypass line once detected. As soon as a bypass line goes off-net, the previous PI while able to detect but unable to prevent again.

In accordance with the foregoing, there is a need in the art of a system, a method, and a computer product for providing an operator based and network based solution that gives the operator intelligence to deal with above mentioned problems.

In this document, we will mix the use of termination bypass fraud and SIM box fraud to simplify description although it should be understood that termination bypass is more generic than the SIM box fraud and the described solution on SIM box fraud can be equally applied to termination bypass fraud in general.

SUMMARY

The present invention is directed towards a method and system for detecting and preventing bypass fraud in telecommunication networks. The invention in its various aspects is directed towards method and system for detecting termination bypass in general and SIM box fraud in particular in telecommunication networks by introducing real subscriber numbers of a home operator for test calls without affecting the real subscribers.

The method includes generating one or more test calls from a remote agent to a local agent while the local agent is a subscriber number and the remote agent can be a roaming agent or remote dialer; whereas a roaming agent is created at a roaming partner of the home operator and a remote dialer is a dialing service connected worldwide VoIP carriers, wholesale carriers and calling cards services. The method further includes facilitating call forwarding of the test calls from the local agent to a local number. The method further includes randomly answering the test calls or apply different caller ID to the test calls. The method includes identifying presence of a bypass fraud by analyzing caller identification information of the test call received on the local number. Finally the method includes immediately barring the bypass line's originating call capability, depleting its prepaid balance or completely suspend or terminate its subscription profile for an on-termination bypass line and for an off-net bypass line, the method uses the database of collected bypass lines to intercept all calls from off-net networks by disabling or disrupting on calls with caller id from the database of off-net bypass lines.

The system of the present invention, in its various aspects prevents bypass fraud in telecommunication networks after detecting a bypass using a deployed gateway in a home operator. For an on-net bypass line, the gateway immediately bar the line's originating call capability, depleting its prepaid balance or completely suspend or terminate its subscription profile. For an off-net bypass line, the gateway stores them in a database and uses the database to intercept all calls from off-net networks by disabling or disrupting on calls with caller id from the database of off-net bypass lines.

The system of the present invention, in its various aspects detects bypass fraud in telecommunication networks, by deploying a gateway in a home operator network. The gateway then generates one or more test calls from a remote agent to a local agent while the local agent is a subscriber number and the remote agent can be a roaming agent or remote dialer; whereas a roaming agent is created at a roaming partner of the home operator and a remote dialer is a dialing service connected worldwide VoIP carriers, wholesale carriers and calling cards services. The gateway further facilitates call forwarding of the test calls from the local agent to a local number. This local number is test a number from the home operator. Finally, the gateway identifies presence of bypass fraud by analyzing caller identification information of the test call received on the local number.

The system of the present invention, in its various aspects detects bypass fraud in telecommunication networks by simulating human like behavior on local agents. This is achieved by auto-answering the call on the local agent or by directing the call on the local agent to an answer-machine like system.

The system of the present invention, in its various aspects prevents bypass fraud in telecommunication networks after detecting a bypass using a deployed gateway in a home operator. For an on-net bypass line, the gateway immediately bar the line's originating call capability, depleting its prepaid balance or completely suspend or terminate its subscription profile. For an off-net bypass line, the gateway stores them in a database and uses the database to intercept all calls from off-net networks by disabling or disrupting on calls with caller id from the database of off-net bypass lines.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one aspect" or "an aspect" means that a particular feature, structure or characteristic, described in connection with the aspect, is included in at least one variation of the present invention. The appearance of the phrase "in an aspect", in various places in the specification, does not necessarily refer to the same aspect.

The present invention provides a system and a method for detecting bypass fraud in telecommunication networks. The general idea of this invention is to create a test call from a remote agent to a local agent of a home operator (i.e., a host operator) that deploys this invention to detect bypass fraud in termination calls within the home operator network. The remote agent can be a roaming agent at a roaming or interconnect partner of the home operator or a remote dialer connected to wholesale carriers, VoIP carriers or calling cards service providers. This thus helps in preventing revenue losses by controlling all fraud before any real fraud occurs. The present invention further helps the hosting operator to increase revenue, reduce loss, prevent fraud and improve customer experience and quality.

The host network operator deploys an Advanced Predictive Intelligence solution, described in this present invention, (hereinafter, referred as Advanced PI or PI) for detecting bypass fraud in telecommunication networks. The host network operator deploys the gateway of advanced PI either within the host network or at a centralized location that is connected to the host network. In the latter implementation, one PI gateway is able to serve multiple home operators in same or different countries to detect bypass fraud.

The advanced PI method includes creating a test call from a remote agent at an originating call country to a local agent of the home operator. The local agent number is chosen from a real subscriber number of the home operator. The idea is to use either selected or entire subscriber numbers of the home operator for a short time as local agents and then to temporarily forward the test call to a local number (i.e., test number within host operator). This local number is configured to pass the call control to the PI gateway deployed in terminating call country (i.e., the home/host operator). Finally, the method includes identifying presence of a bypass fraud by analyzing caller ID of the test call received on the local number. After the test call is completed, the subscriber number's earlier call forwarding state is restored as before. In this way, it is virtually impossible for the bypass fraudster to detect pattern usages of real subscriber numbers. Even in case these subscriber numbers are blacklisted for bypasses, they will not be bypassed in future for any calls to them, thus achieving the ultimate goal of reducing bypass fraud.

One aspect of the invention is to have a roaming agent as a remote agent. As a result of the setup the general call flow of the implementation of this aspect is like: the PI gateway creates a roaming agent via a virtual profile creation at a roaming partner network of the home operator while the profile contains all conditional call forwardings to a local agent. It then initiates a test call to the roaming agent number. The call reaches the roaming partner network. Since the roamer is virtual the call is forwarded to the local agent (i.e., subscriber number), which essentially simulates an international call from the roaming partner operator network to the home operator network. The call then reaches the home network on the local agent. A bypass fraudster might be involved in this leg of call. Since the real subscriber number is momentarily forwarded to a test number by PI gateway, the call control finally terminates at the PI gateway. The PI gateway can then examine the caller ID of the test call to determine if a bypass has been done or not.

Another aspect of the invention is to have a remote dialer as a remote agent. As a result of the setup the general call flow of the implementation of this aspect is like: the PI gateway passes a local agent number to the remote dialer to make an immediate call. The remote dialer then initiates a test call to the local agent number. The call reaches the home operator network on the local agent. A bypass fraudster might be involved in this leg of call. Since the real subscriber number is momentarily forwarded to a test number by PI gateway, the call control finally terminates at the PI gateway. The PI gateway can then examine the caller ID of the test call to determine if a bypass has been done or not. The remote dialer informs the PI gateway the test call information such as caller ID, called number, carrier used, date, time and duration of the call. The PI gateway passes the result of the test call to the remote dialer.

In its various implementation of the present invention, advanced PI solution is signaling (SS7 or IP) based and is deployed for the terminating country of the home operator of a test call. It will apparent to a person skilled in the art that the invention can also be used for non-signaling based solution although it will then require additional configuration and more manual control is required.

To simplify the description in the document, we explain the various aspects of the present invention, by interchangeably using GSM SIM box detection and termination bypass detection as they equally illustrate the invention. However, it will be appreciated by a person skilled in the art the present invention can be similarly generalized to other lines of bypasses detection, including but not limited to, fixed line bypass, CDMA bypass, GSM bypass on national and international call circuits.

Figure 1:
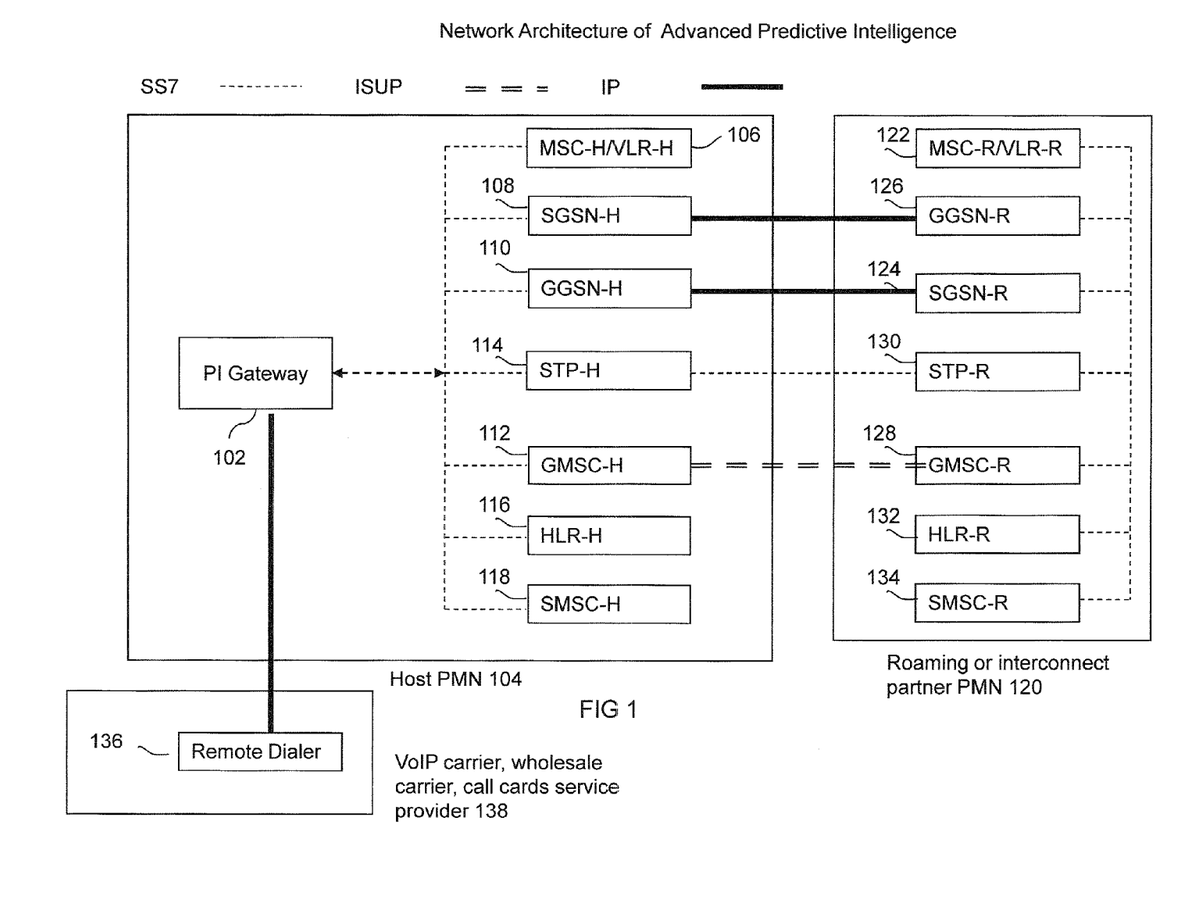
FIG. 1 illustrates a system for implementing detection of bypass fraud in telecommunication networks, in accordance with an aspect of the present invention.

FIG. 1 illustrates a system 100 that implements the advanced PI in accordance with an aspect of the present invention. System 100 includes a Predictive Intelligence (PI) module 102 (i.e., the PI gateway or the gateway) in a host Public Mobile Network (PMN) 104 (i.e., the host network). PI module 102 has ability to detect bypass fraud in telecommunication networks, particularly to detect, track and prevent SIM box fraud in telecommunication. Host PMN 104 operator uses PI module 102 to communicate a remote agent for generating test calls to a local agent in the host PMN 104. Host PMN 104 further includes a Mobile Switching Center (MSC)/Visiting Location Register (VLR) 106, a Serving GPRS Support Node (SGSN) 108, a Gateway GPRS Support Node (GGSN) 110, a Gateway MSC (GMSC) 112, a Signal Transfer Point (STP) 114, a Home Location Register (HLR) 116 and a Short Message Service Center (SMSC) 118. Since network elements MSC/VLR 106, SGSN 108, GGSN 110, GMSC 112, STP 114, HLR 116 and SMSC 118 reside in Host PMN 104, they are hereinafter referred to as MSC-H/VLR-H 106, SGSN-H 108, GGSN-H 110, GMSC-H 112, STP-H 114, HLR-H 116 and SMSC-H 118, respectively. These network elements communicate with each other over a Signaling System 7 (SS7) link (represented by dashed lines in FIG. 1 or an Internet Protocol (IP) link (represented by solid lines in FIG. 1).

System 100 further includes a roaming or interconnect partner PMN 120 (i.e., the interconnect partner network need not be mobile) that is associated with host PMN 104. It will be apparent to a person skilled in the art that system 100 may include various other partner networks. However, for the sake of convenience, this aspect considers only one partner network (i.e., PMN 120, roaming or interconnect, mobile or non-mobile). The partner PMN 120 includes a MSC/VLR 122, a SGSN 124, a GGSN 126, a GMSC 128, an STP 130, an HLR 132 and an SMSC 134 some of these elements might not be present in a non-mobile network. Since network elements MSC/VLR 122, SGSN 124, GGSN 126, GMSC 128, STP 130, HLR 132 and SMSC 134 reside in roaming partner PMN 120, they are hereinafter referred to as MSC-R/VLR-R 122, SGSN-R 124, GGSN-R 126, GMSC-R 128, STP-R 130, HLR-R 132 and SMSC-R 134, respectively.

All these network elements of partner PMN 120 communicate with each other over the SS7 link or the IP link. Further, as shown in FIG. 1, the network elements of partner PMN 120 also communicate with the network elements of host PMN 104. For example, GMSC-R 128 communicates with GMSC-H 112 over an ISDN User Part Protocol (ISUP) link, whereas SGSN-R 124 and GGSN-R 126 communicate with GGSN-H 110 and SGSN-H 108, respectively via the IP link. Other network elements of partner PMN 120 (e.g., MSC-R/VLR-R 122) communicate with various other network elements of host PMN 104 (e.g., HLR-H 116) via the SS7 link. It will also be apparent to a person skilled in the art that host PMN 104 and partner PMN 120 may also include various other network components (not shown in FIG. 1), depending on the architecture under consideration. In an aspect of the present invention, various network elements of host PMN 104 and partner PMN 120 are located in an IR.21 database (not shown in FIG. 1) such as RAEX IR.21. In an aspect of the present invention, the IR.21 database is coupled to PI module 102.

System 100 further includes one or more wholesale carriers, VoIP or calling service provider partner networks 138 that is associated with host PMN 104. It will be apparent to a person skilled in the art that system 100 may include various other partner networks. The partner networks 138 are connected with a remote dialer, which communicates with the PI gateway in host PMN 104 via IP signaling.

PI gateway 102 connects with various components within host PMN 104 and partner PMN 120 or partner networks 138 to detect, track and prevent SIM box fraud being applied on its subscribers.

Figure 2:
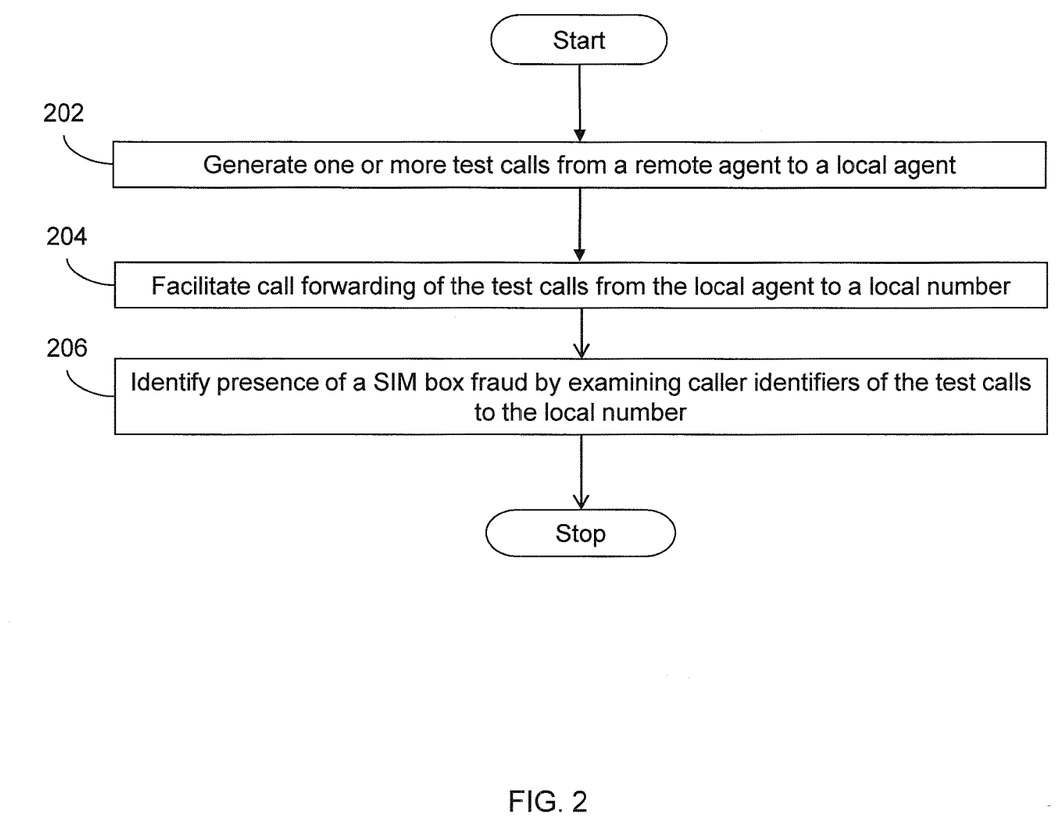
FIG. 2 represents a flowchart for detection of bypass fraud in telecommunication, networks, in accordance with an aspect of the present invention.

FIG. 2 represents a flowchart for detection of bypass fraud in telecommunication networks, in accordance with an aspect of the present invention. The PI gateway 102 communicates with a remote agent.

While the remote agent is a remote dialer, PI gateway 102 communicates with the remote dialer in a partner network 138, using IP with a local agent number. Now, in order to start detecting SIM box fraud, at step 202, PI gateway 102 instructs the remote dialer to make test calls to the local agent.

While the remote agent is a roaming agent, PI gateway 102 first creates a roaming agent in roaming partner PMN 120, using signaling techniques. This means, PI gateway 102 creates a fake profile of subscriber with all conditional call forwarding to a local agent, at roaming partner PMN 120 to form a roaming agent. Now, in order to start detecting SIM box fraud, at step 202, PI gateway 102 sets up test calls from the roaming agent to the local agent. This is achieved by generating one or more test calls to this roaming agent. For the sake of explanation, one test call is considered to explain the working on the invention. However, a person skilled in the art would appreciate that many such test calls will be made by PI gateway 102 to detect and prevent SIM box fraud. Thereafter, PI gateway 102 facilitates call forwarding of the test call from the roaming agent to a local agent. In one aspect of the present invention, this call forwarding is conditional as the roaming agent does not respond to the test call, as it does not exist, so the test call gets forwarded to a pre-configured local agent number.

Thereafter, at step 204, PI gateway 102 facilitates call forwarding of the test calls from the local agent to a local number. In accordance with an aspect of the present invention, the local number is a number from host PMN network 104. The local number is selected from a pool of predefined numbers. In one aspect, this call forwarding is unconditional call forwarding from the local agent to the local number. Finally, at step 206, PI gateway 102 identifies presence of a SIM box by tracking the termination of the test calls to the local number.

In accordance with an aspect of the present invention, PI gateway 102 configures the local number to deliver the call control (through T-CSI provisioning) to PI gateway 102. Based on this, PI gateway 102 identifies the caller ID of the test call while terminating at the local number. In case this caller ID is different from the caller ID set at the time when PI gateway initiated this test call from the remote agent to the local agent, then it is identified as a SIM box fraud in the call circuit after the caller ID passes thru some false positive analysis logics.

In accordance with the earlier PI patent application, the gateway did not answer the test calls to avoid (roaming, international or national) costs associated with these test calls. This enabled the SIM box fraudsters to determine that some of these calls are actually test calls and they hence avoided using these test calls for their SIM box bypassing. Hence the key premise for a stable SIM box detection is correlated with the non-detection of the tracking activity by the fraudsters. In order to overcome this situation, in accordance with various aspects the present invention, the PI gateway generates the test calls with randomized call parameters and also answers some of the test calls to avoid being detected by SIM box fraudsters. In accordance with an aspect of the present invention, the call parameters are randomized using one or more of:

1. Calling party in test call with no CLI
2. Calling party in test calls with real subscriber number
3. Calling party in test calls with any number
4. Test call from random number from roaming PMN 120
5. Test call from any corrupted number
6. Origin of release of the test call (either from calling side or called side)

In accordance with an aspect of the present invention, PI gateway 102 releases the test call immediately after detecting the SIM box fraud. In another aspect of the present invention, PI gateway 102 releases the test call after a configurable time period. In another aspect of the present invention, the local agent is selected from a quarantined pool of numbers. Also, selection of the local agent for a test call is controlled in order that any local agent is not selected twice until the entire pool of local agents is used once for generating these test calls. In another aspect of the present invention, a local agent may be quarantined for a longer term.

In order to ensure that SIM box fraudsters do not detect the test calls, in accordance with various aspects of the present invention, PI gateway 102 answers the test calls at the terminating local number. In another aspect, the test calls are answered for a configurable duration. In yet another aspect, the test calls are answered based on monitored cost of the test calls that helps in defining the configurable duration of answering. In one aspect of the invention, PI gateway 102 is coupled with a cost metering logic module that provides the cost of the test call. The cost metering logic is invoked before the test call is answered. Now, in case the cost metering logic detects a budget cap has reached, the PI gateway 102 does not invoke the answering logic and the test call will be released. As the cost of the test calls varies with the type of call, the operator determines different answering logics for implementing advanced PI in mobile environment or wholesale subsystems.

In another aspect of the present invention, PI can also be extended to cover non mobile originated networks such as calling cards, wholesale carriers and VoIP carriers. The basic idea is to communicate with a remote dialer by providing a local agent number to call. The remote dialer can be a GSM SIM probe, a fixed line probe, a calling card service or dialer involving voip carriers and wholesale carriers. It functions similar to a roaming agent except that the remote dialer will directly make a call rather than triggered by call forwarding from a call on a roaming agent started by PI.

PI can also optionally provide a calling number to the remote dialer to present as caller I'd of the test call. The local agent can be test numbers or real subscribers. After performing the test call by the remote dialer, the dialer can inform the PI system (the called number, the calling number, the time and date and time zone of the call, route or carrier used). PI system will respond with the actually received caller I'd and other information (such as time of the test call received). The PI system and remote dialer can communicate via IP or SS7 or any other communication mechanism. The selection of local agent will be same as before. In particular, when a real subscriber is selected for a remote dialer, PI does the unconditional call forwarding to a test number beforehand. Also after the remote dialer informs PI system for the call it has just made, PI system will restore the real subscriber unconditional call forwarding profile as before.

In one aspect of the present invention, once a SIM box or termination bypass fraudster is identified thru the use of a local number, the local number can be quarantined for further use for a while based on some logic.

Figure 3:
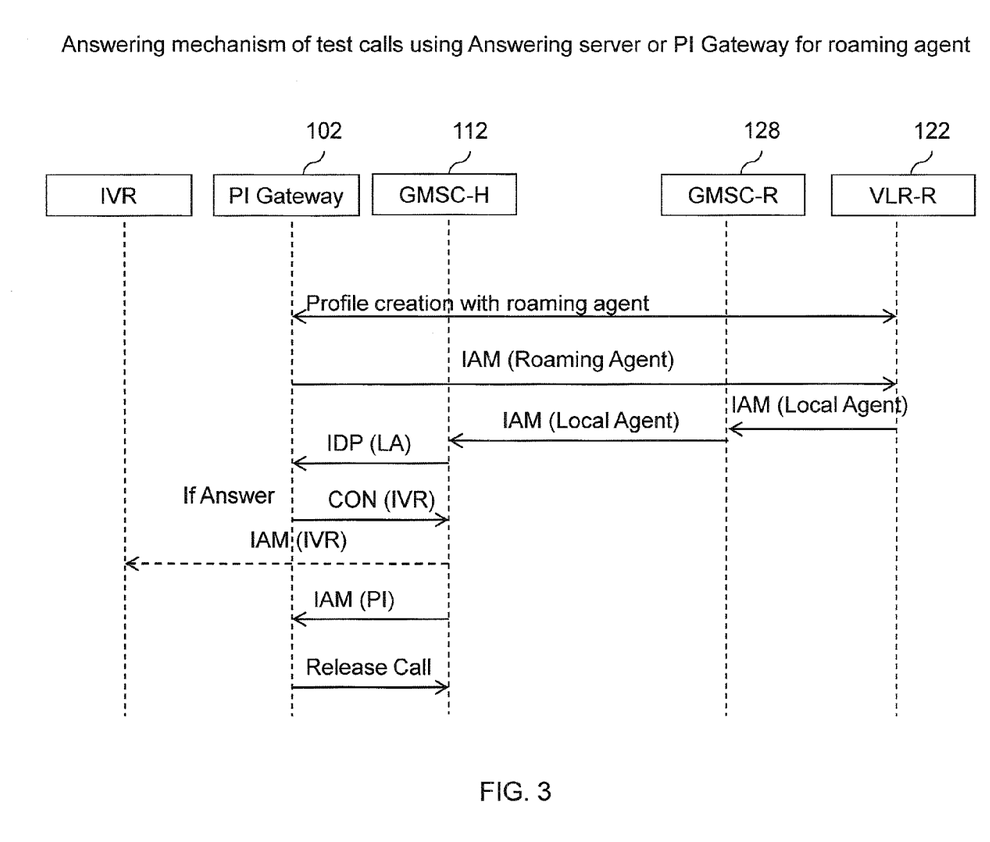
FIG. 3 represents a flow diagram for answering test calls to detect the SIM box fraud, in accordance with an aspect of the present invention.

In subsequent descriptions, a roaming agent is used to illustrate the remote agent. It should be apparent to the skill of the art that the remote dialer can be similarly applied as a remote agent, FIG. 3 represents a flow diagram for answering test calls to detect the SIM box fraud, in accordance with an aspect of the present invention. As explained above for a roaming agent as a remote agent, PI gateway 102 first creates a profile of a roaming agent at roaming PMN 120. Thereafter, initiates a test call towards the roaming agent using IAM (RA) message. Since the roaming agent, is virtual (non-existent), it doesn't answer the call and hence the call gets forwarded to a local agent. The conditional call forwarding is already done by PI gateway 102. Thereafter, the forwarded call to the local agent reaches GMSC of host PMN (GMSC-H 112). The GMSC-H 112 then sends an IDP (Local Agent) message to PI gateway 102 requesting for termination. Now, the local agent is preconfigured with unconditional call forwarding (CFU) to a local number. If PI gateway 102 decides to answer the test call, then it returns the IDP enquiry from GMSC-H 112 with a Continue message with IVR address. This IVR address is the number of an automated answering server used by the host PMN 104 operator. In another aspect of the present invention, the PI gateway 102 itself answers the call, so returns the Continue message with its own address. Therefore, GMSC-H 112 accordingly sends an IAM message to either the IVR or PI gateway 102. Subsequently, after tracking the caller ID while termination, PI gateway 102 determines presence of a SIM box and releases the test call.

With the improved statistical tools to gather intelligence about call activity, many SIM box fraudsters track the calls to local agent numbers and blacklist them for bypass lines. In order to overcome this limitation, in accordance with various aspects of the present invention, real subscribers are used as local agents. This allows increasing the number of local agents to potentially the number of actual subscribers with host PMN 104. Now since the local agent is a real subscriber, configuration is done its profile at HLR-H 116 to enable PI gateway 102 get the call termination details. In one aspect of the present invention, PI gateway 102 uses CAMEL T-CSI approach where local agent/ real subscriber is provisioned with a static T-CSI at HLR-H 116. In another aspect of the present invention, PI gateway 102 has unconditional call forwarding (CFU) set in HLR-H 116 to point to a local number. Both these configurations ensure that there is no customer impact and that dependency on PI gateway is not there. For example, when PI gateway is operational, the subscriber never sees that he was used for a test call, as his experience is seamless. Also, in case PI gateway is not operational then subscriber still receives his regular call but not any test call.

Figure 4:
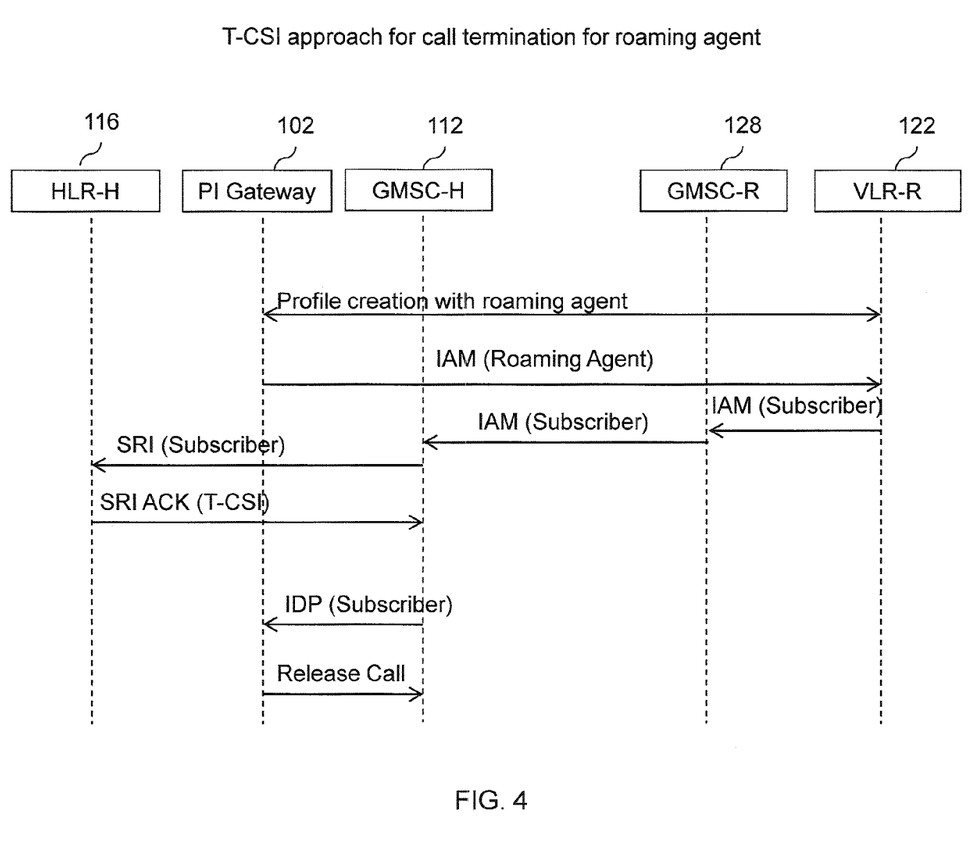
FIG. 4 represents a flow diagram for handling test calls when T-CSI is configured in subscribers' profile to prevent SIM box fraud, in accordance with an aspect of the present invention.

FIG. 4 represents a flow diagram for handling test calls when T-CSI is configured in subscribers' profile to prevent SIM box fraud, in accordance with an aspect of the present invention. The host PMN operator 104 defines a T-CSI or INAP equivalent that points to PI gateway 102 in subscriber's profile. This configuration happens via regular HLR process at host PMN operator 104. As a result, any call towards subscriber triggers a CAMEL/IDP interaction between GMSC-H 112 and PI gateway 102. Since test calls are controlled by PI gateway 102, only these test calls are released by PI gateway 102. Any calls outside the test calls are allowed to continue as usual. PI gateway 102 configures the CAMEL T-CSI with a Default call handling to 'Continue' to ensure MT calls for subscriber are running smoothly even when PI gateway 102 is unavailable. As shown in FIG. 4, PI gateway 102 sends an IAM for subscriber as Local agent, to VLR-R 122. The VLR-R 122 returns the IAM to GMSC-R 128, which in turn forwards the IAM (subscriber) to GMSC-H 112. GMSC-H 112 then sends an SRI to HLR-H 116 and when GMSC-H 112 receives T-CSI in SRI ACK then it triggers CAMEL MT-IDP to PI gateway 102. Now, PI gateway 102 may release or continue depending on if test call is ongoing. In case real subscriber is not being used for test calls any call coming to subscriber is answered by PI gateway 102 with a Continue message.

Figure 5:
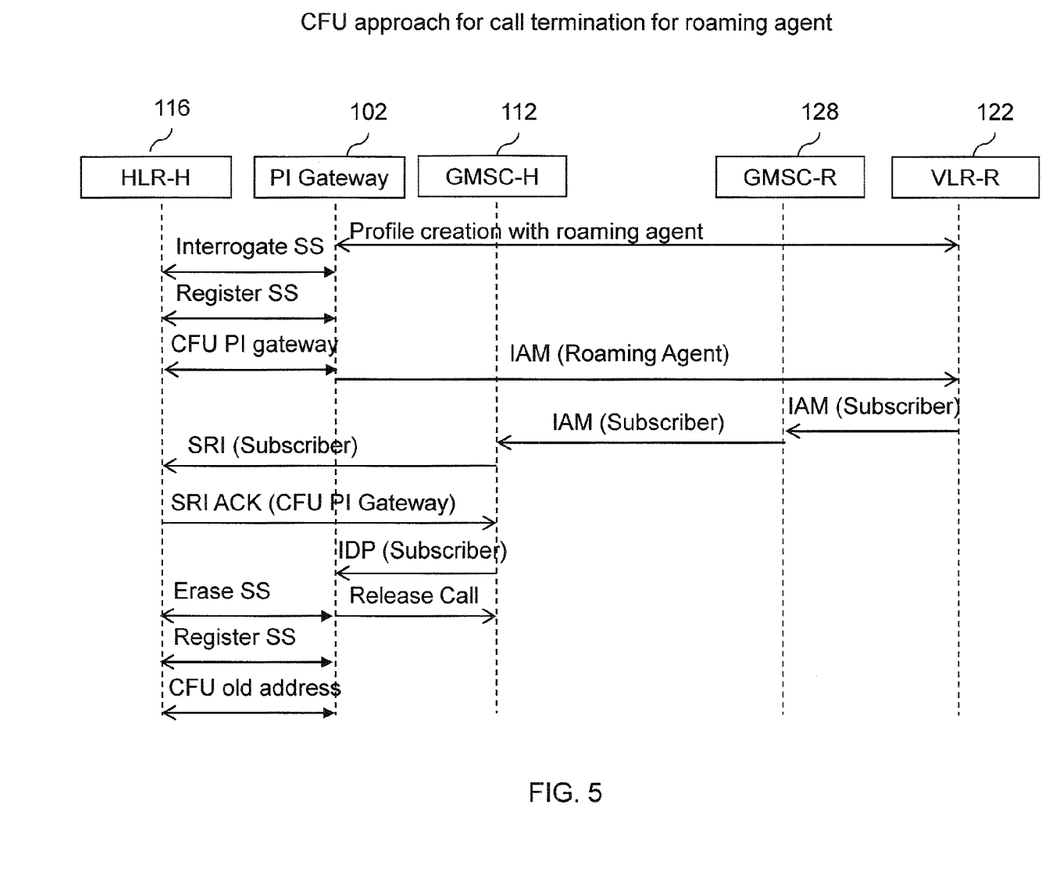
FIG. 5 represents a flow diagram for handling test calls when CFU is configured in subscribers' profile to prevent SIM box fraud, in accordance with an aspect of the present invention.

As T-CSI requires static configuration, in an alternative aspect of the present invention, PI gateway 102 dynamically controls configuration of activation or deactivation of unconditional call forwarding (CFU) for a selected subscriber pointing to an existing local agent. The CFU is configured after the test is done, by updating the subscriber's HLR profile. In accordance with various aspects of the present invention, only one subscriber at a time is selected as a local agent. As soon as the test call is completed, CFU is removed from subscriber's profile. FIG. 5 represents a flow diagram for handling test calls when CFU is configured in subscribers' profile to prevent SIM box fraud, in accordance with an aspect of the present invention. Once PI gateway 102 creates the roaming agent, it sends an Interrogate SS to HLR-H 116 and sets up CFU in subscriber's profile. Thereafter, when PI gateway 102 initiates the test call to roaming agent, it gets the call back as roaming agent has a conditional CF (no answer) towards the subscriber. Subsequently, PI gateway 102 sends SRI message to HLR-H 116. The HLR-H 116 returns the CFU to PI gateway 102, thereafter, GMSC-H 112 sends the IDP (subscriber) to PI gateway 102. PI gateway 102 releases the test call and then erases the CFU configuration from PI gateway to the old CFU address.

In accordance with various aspects of the present invention, only one real subscriber is used as a local agent at a time. Although the host PMN operator 104 could allocate potentially million of subscribers as local agents, thereby avoiding detection from SIM box fraudsters, the procedure is applied only to one subscriber at a time and is suspended as soon as the test is completed. Further, before performing this test call, PI gateway 102 always stores the original CFU address of the subscriber that is restored once the test is complete. All actions taken by PI gateway are maintained on a non-volatile medium that ensures a CFU deactivation via external watchdog processes.

In another aspect of the present invention, test call pattern to subscribers as local agents is setup in line with actual traffic pattern and final destination behavior. This helps in maintaining the stealth mode of SIM box detection. This is achieved by randomly answering a test call with random duration, also by randomly forwarding a test call to an answering machine like device or randomly changing caller ID (unknown, international number, any real subscriber number, fake and ill-formatted caller ID etc).

In addition to answering cost of intentionally answered calls, there are also costs of early answer fraud in the test calls. These are generated for some transit carriers to answer a call before the called party actually answers the call. To control all these costs, answered calls are all metered based on some configuration. The metering can be done per remote network which can be a roaming partner network, a wholesale carrier network, a VoIP carrier or a calling card service provider.

Once the SIM box or termination bypass fraudster is identified, it is important that the bypass line is prevented for future use. For an on-net SIM box, the gateway immediately bar the SIM box's originating call capability, depleting its prepaid balance or completely suspend or terminate its subscription profile. For an off-net bypass line, the gateway stores them in a database and uses the database to intercept all calls from off-net networks by disabling or disrupting on calls with caller id from the database of off-net bypass lines.

In one aspect of the present invention, PI gateway 102 deactivates the on-net SIM box by barring all international calls to VLR where SIM box is being latched. There is a configurable time difference set between time SIM box is detected and deactivated. It is ensured that this time difference does not form a pattern that can affect the stealth mode of SIM box detection.

Figure 6:
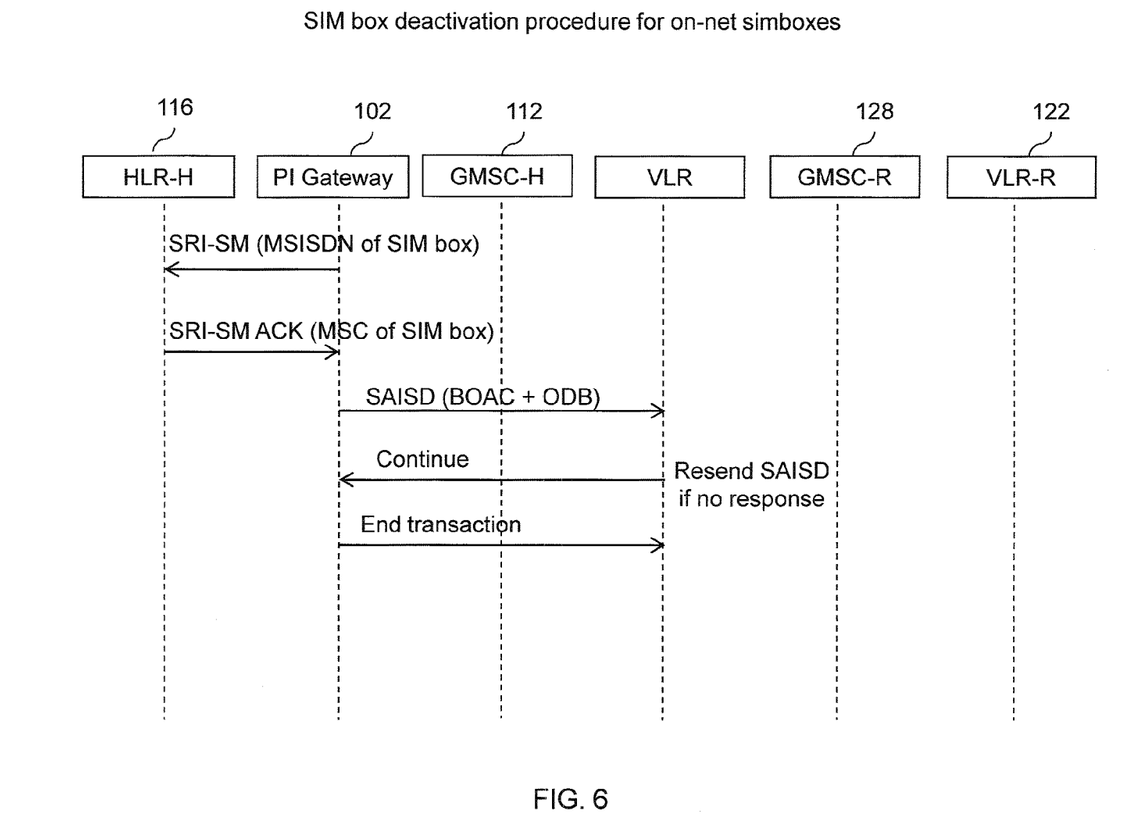
FIG. 6 represents a flow diagram for deactivating on-net SIM boxes upon detection, in accordance with an aspect of the present invention.
Figure 7:
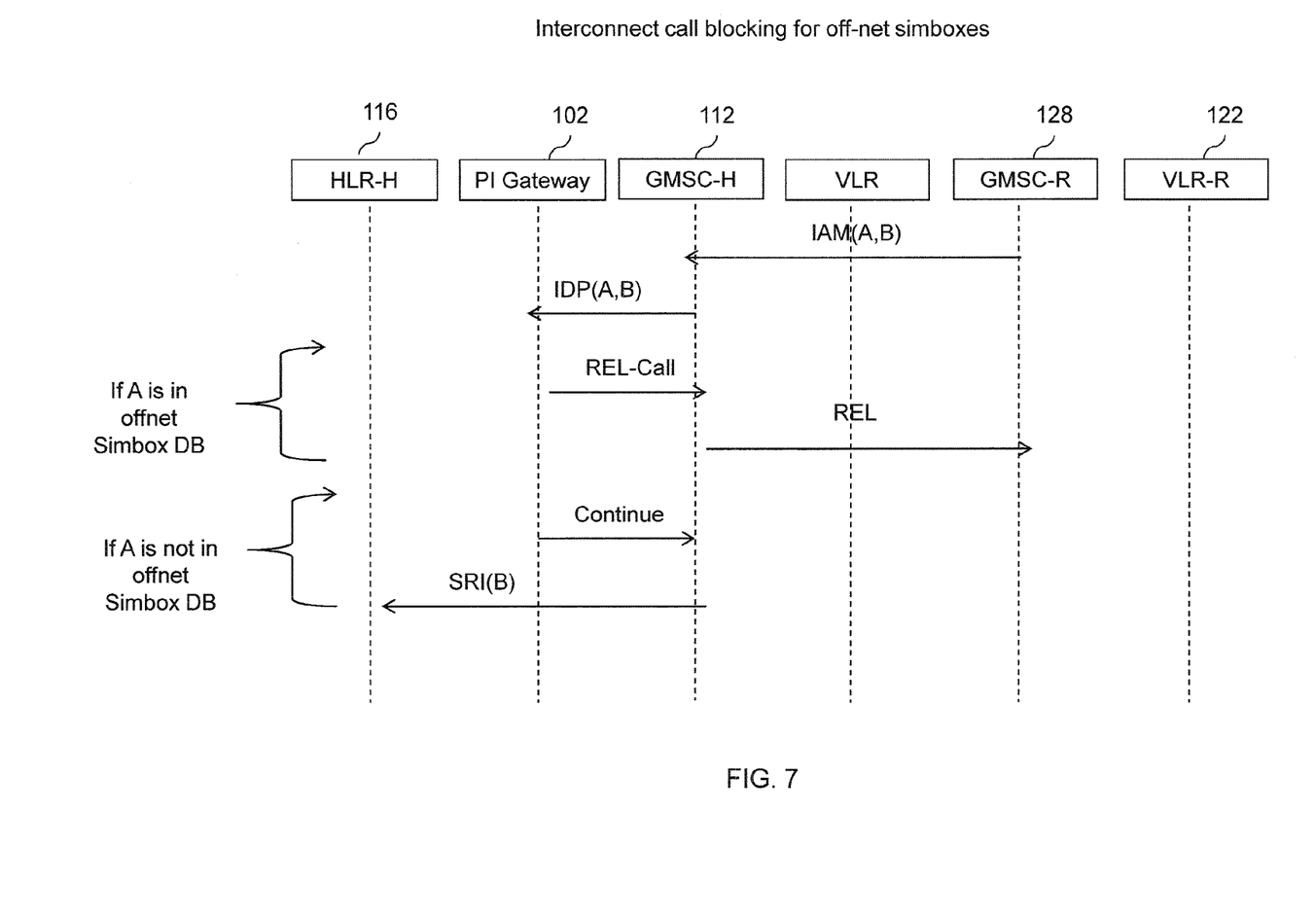
FIG. 7 represents a flow diagram for blocking off-net calls on detected off-net SIM boxes, in accordance with an aspect of the present invention.

FIG. 6 represents a flow diagram for deactivating SIM boxes upon detection, in accordance with an aspect of the present invention. Upon detection of SIM box MSISDN, PI gateway sends SRI-SM to HLR-H 116 with MSISDN as SIM box number to get its location. HLR-H 116 in response to PI gateway 102, with SRI-SM ACK sends the MSC address where SIM box is latched on. PI gateway 102 thereafter, finds the corresponding VLR from the MSC-VLR address mapping. Subsequently, PI gateway sends SAISD (with BOAC or ODB or both) to this identified VLR to bar all international calls for this SIM box MSISDN. VLR may send Continue in response to PI gateway 102. Finally, PI gateway 102 sends End to close the transaction. This signifies that SIM box number is successfully barred in that VLR for any calls. In case the VLR does not respond with Continue or error is received, the PI gateway 102 again sends the SAISD to VLR depending upon configuration in table pi_error_retry_details. This table contains information regarding the error code on which retry should be done to again send SAISD to VLR and how many times this retry should be done.

In another aspect of the present invention, the deactivation of the on-net SIM box can just be suspended or disablement of the subscriber line profile via home operator network API.

In another aspect of the present invention, the on-net SIM box is not deactivated but tracked for their usages and movement to prepare a legal battle and to catch a bigger fish of finding the location of the SIM box operator. This is achieved by creating an O-CSI subscription profile for the SIM box. For every call initiated by the SIM box, the call control will come to the PI gateway, which can then record the usage, location information etc.

In another aspect of the present invention, the deactivation of the on-net SIM box is also dependent on the remaining credit in the prepaid account. In other words, PI gateway 102 sends a USSD query to the Prepaid System (PPS) to request the credit level in the prepaid account. In one aspect, when credit level is below a configurable threshold (say 3 Euros) the deactivation is completed by PI gateway 102. In another aspect when credit is above, PI gateway 102 polls the credit level either at predetermined interval or at the end of next test calls (in case activity tracking is enabled). Alternatively, PI gateway 102 sends an SNMP email to fraud staff to empty the prepaid account.

In another aspect of the present invention, for an off-net bypass line, the gateway stores them in a database and intercepts all calls from off-net networks by disabling or disrupting on calls with caller id from the database of off-net bypass lines. The call triggers from off-net networks can be SS7 based call control such as ISUP, IN, CAMEL or IP based call control such as SIP etc. FIG. 6 represents a flow diagram for blocking off-net calls involving off-net SIM boxes from the database. An off-net call with caller ID A to a B number of the host PMN 104 reaches GMSC-H 112, which passes call control to PI gateway. If A is found in the off-net SIM box database, PI releases call; otherwise PI continues the call.

It will be apparent to a person skilled in the art, that the present invention can also be applied to Code Division Multiple Access (CDMA)/American National Standards Institute #41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, system 100 will have a separate SS7 and network interfaces, corresponding to both the HPMN and VPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
| --- | --- |
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention can take the form of an entirely hardware aspect, an entirely software aspect, or an aspect containing both hardware and software elements. In accordance with an aspect of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CDROM), compact disk—read/write (CD-R/W) and Digital Versatile Disk (DVD).

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated aspects of the present system is not intended to be exhaustive or to limit the present system to the precise form disclosed. While specific aspects of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various aspects described above can be combined to provide further aspects. These and other changes can be made in light of the above detailed description.
Other Variations Provided above for the edification of those of ordinary skill in the art, and not as a limitation on the scope of the invention, are detailed illustrations of a scheme for proactive roaming tests, discoveries of roaming partner services and discoveries of fraud in roaming using simulated roaming traffic. Numerous variations and modifications within the spirit of the present invention will of course occur to those of ordinary skill in the art in view of the aspects that have been disclosed. For example, the present invention is implemented primarily from the point of view of GSM mobile networks as described in the aspects. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain aspects of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific aspects of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CLI | Calling Line Identification |
| CSD | Circuit Switched Data |
| CSI | Camel Subscription Information |
| DPC | Destination Point Code |
| DSD | Delete Subscriber Data |
| DTMF | Dual Tone Multi-Frequency |
| ERB | CAP Event Report Basic call state model |

APPENDIX-continued

| Acronym | Description |
|---|---|
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |
| PDU | Packet Data Unit |
| PRN | MAP Provide Roaming Number |
| PSI | MAP Provide Subscriber Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | User Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

Technical References, the entirety of each of which is incorporated by this reference herein:

John Jiang and David Gillot [PI 2007] A single operator and network side solution for inbound and outbound roaming tests and discoveries of roaming partner services and fraud without involving remote probes or real roamer traffic—Phase 1

John Jiang and David Gillot [PI 2008] A single operator and network side solution for inbound and outbound roaming tests and discoveries of roaming partner services and fraud without involving remote probes or real roamer traffic GSM 378 Camel Phase 2

Camel 978 Camel Application Protocol

GSM 379 on CAMEL Support of Optimal Routing (SOR)

GSM 318 Basic Call Handling

IREG 32

IREG 24

ITU-T Recommendation Q.1214 (1995), Distributed functional plane for intelligent network CS-1;

ITU-T Recommendation Q.1218 (1995), Interface Recommendation for intelligent network CS-1;

ITU-T Recommendation Q.762 (1999), Signaling system No. 7—ISDN user part general functions of messages and signals;

ITU-T Recommendation Q.763 (1999), Signaling system No. 7—ISDN user part formats and codes;

ITU-T Recommendation Q.764 (1999), Signaling system No. 7—ISDN user part signaling procedures;

ITU-T Recommendation Q.766 (1993), Performance objectives in the integrated services digital network application;

ITU-T Recommendation Q.765 (1998), Signaling system No. 7—Application transport mechanism;

ITU-T Recommendation Q.769.1 (1999), Signaling system No. 7—ISDN user part enhancements for the support of Number Portability BA 19 GSMA RAEX on AA 14 and IR 21

FF 17 International Revenue Share Fraud

We claim:

1. A method for detecting bypass fraud in a telecommunication network, the method comprising:
   generating one or more test calls from a remote agent to a local agent, wherein the local agent is a subscriber number of a subscriber;
   facilitating call forwarding of the test calls from the local agent to a local number; and
   identifying a presence of bypass fraud by analyzing caller identification information of the test call received on the local number.

2. The method of claim 1, wherein the test calls from the remote agent are triggered by a Predictive Intelligence (PI) gateway.

3. The method of claim 1, wherein the subscriber is selected based on predefined logic.

4. The method of claim 1, wherein the subscriber number is selected from a pool of subscriber numbers as a local agent.

5. The method of claim 1, wherein the call forwarding from the local agent to the local number is facilitated by setting unconditional call forwarding in a profile of the subscriber to the local number.

6. The method of claim 1, wherein the remote agent is a roaming agent created in a roaming partner network of the network the subscriber numbers belong to, wherein the roaming agent has a conditional call forwarding profile set to the local agent.

7. The method of claim 1, wherein a current unconditional call forwarding profile of the subscriber is stored before facilitating call forwarding from the local agent to the local number.

8. The method of claim 1, further comprising:
   restoring the stored unconditional call forwarding profile of the subscriber after the test call is completed.

9. The method of claim 1, wherein the bypass detected is one of an on-net and off-net GSM SIM box.

10. The method of claim 9, wherein the GSM SIM box presence is detected by tracking caller ID while terminating the test calls to the local number.

11. The method of claim 10, wherein the GSM SIM box presence is suspected when an originating caller ID in the test calls generated to the roaming agent is different from the caller ID in the test calls terminating to the local number.

12. The method of claim 10, wherein the caller ID of the test call is tracked by provisioning T-CSI in the local number's profile.

13. The method of claim 9 further comprising:
   releasing the test calls upon detection of the GSM SIM box.

14. The method of claim 13, wherein the test calls are released immediately after detection of the GSM SIM box.

15. The method of claim 13, wherein the test calls are released after a configurable time period.

16. The method of claim 9 further comprising:
   answering the test calls to identify the GSM SIM box.

17. The method of claim 16, wherein the test calls are answered for a pre-defined time period.

18. The method of claim 16, wherein a cost of the test calls is monitored to determine the pre-defined time period for answering the test calls.

19. The method of claim 9, wherein the GSM SIM box is an on-net GSM SIM box, the method further comprising:
   deactivating the on-net GSM SIM box by barring all calls to VLR where the GSM SIM box is being latched.

20. The method of claim 9, wherein the GSM SIM box is an on-net GSM SIM box, the method further comprising:
   disabling the on-net SIM box based on remaining credit in the prepaid account.

21. The method of claim 9, wherein the GSM SIM box is an on-net GSM SIM box, and wherein a profile of the on-net GSM SIM box is suspended or disabled.

22. The method of claim 9, wherein the GSM SIM box is an on-net GSM SIM box, the method further comprising:
   monitoring a usage, a location and a movement of the on-net GSM SIM box.

23. The method of claim 9, wherein the GSM SIM box is an off-net GSM SIM box, the method further comprising:
   storing the off-net SIM box in a data base and using the database to release any off-net calls from off networks with caller ID from the data base of off-net GSM SIM boxes.

24. The method of claim 9, wherein the GSM SIM box is an off-net GSM SIM box, where the test number is quarantined for a time based on logic each time the test call involving the test number discovered a GSM SIM box.

25. The method of claim 1, wherein the bypass detected is a termination bypass.

26. The method of claim 1, wherein the bypass detected is a fixed line termination bypass.

27. The method of claim 1, wherein the bypass detected is a CDMA termination bypass.

28. The method of claim 1, wherein the subscriber number is provisioned with T-CSI in its HLR to pass the termination call control to PI.

29. The method of claim 1, wherein the subscriber number has unconditional call forwarding set towards the local number in its HLR.

30. The method of claim 1, wherein the local number is selected from a pool of pre-defined numbers.

31. The method of claim 1, wherein the one or more test calls are made using randomized call parameters.

32. The method of claim 31, wherein the call parameters are randomized using one or more of:
- a calling party in test calls with no CLI;
- a calling party in test calls with real subscriber number;
- a calling party in test calls with any number;
- test calls from random number from roaming partner country range;
- test calls from corrupted numbers; and
- an origin of release of the test call.

33. The method of claim 1, wherein the remote agent is a dialer using one of a group consisting of VoIP carriers, wholesale carriers and calling cards.

34. The method of claim 1, wherein a cost of the test call is metered to control the cost of early answer fraud.

35. A system for preventing termination bypass fraud in mobile communication, the system comprising:
- a gateway that causes one or more test calls from a remote agent to a local agent, wherein the local agent is a subscriber number of a subscriber;
- wherein the gateway facilitates call forwarding of the test calls from the local agent to a local number; and
- wherein the gateway identifies presence of termination bypass fraud by analyzing termination of the test calls to the local number.

36. The system of claim 35, wherein the gateway is a termination bypass detection module.

37. The system of claim 35, wherein the gateway uses signalling to generate the test call from the remote agent to the local agent.

38. The system of claim 35, wherein the gateway releases the test calls upon detection of the termination bypass.

39. The system of claim 38, wherein the gateway releases the test calls immediately after detection of the termination bypass.

40. The system of claim 38, wherein the gateway releases the test calls after a configurable time period.

41. The system of claim 38, wherein the gateway answers the test calls to identify a SIM box.

* * * * *